(12) United States Patent
Murakoshi

(10) Patent No.: US 7,373,525 B2
(45) Date of Patent: May 13, 2008

(54) DATA PROCESSING METHOD AND DATA CHECKING METHOD

(75) Inventor: Sho Murakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 541 days.

(21) Appl. No.: 10/888,979

(22) Filed: Jul. 13, 2004

(65) Prior Publication Data
US 2005/0022093 A1    Jan. 27, 2005

(30) Foreign Application Priority Data
Jul. 23, 2003    (JP)    ............... 2003-278461

(51) Int. Cl.
*G06F 11/30* (2006.01)
(52) U.S. Cl. ........................ 713/194; 714/758
(58) Field of Classification Search ................ 714/758; 713/194
See application file for complete search history.

(56) References Cited

U.S. PATENT DOCUMENTS

| | | | |
|---|---|---|---|
| 5,363,448 A * | 11/1994 | Koopman et al. | ............ 713/170 |
| 5,398,284 A | 3/1995 | Koopman, Jr. et al. | |
| 5,649,014 A | 7/1997 | Koopman, Jr. et al. | |
| 5,689,566 A * | 11/1997 | Nguyen | ............ 713/155 |
| 5,724,368 A | 3/1998 | Zook | |
| 6,182,261 B1 * | 1/2001 | Haller et al. | ............ 714/758 |
| 6,289,453 B1 | 9/2001 | Walker et al. | |
| 6,530,057 B1 * | 3/2003 | Kimmitt | ............ 714/758 |
| 6,701,478 B1 * | 3/2004 | Yang et al. | ............ 714/757 |
| 7,055,085 B2 * | 5/2006 | McDaniel | ............ 714/776 |
| 2006/0087407 A1 * | 4/2006 | Stewart et al. | ............ 340/10.52 |

FOREIGN PATENT DOCUMENTS

EP    0 516 898    12/1992

* cited by examiner

*Primary Examiner*—Guy Lamarre
*Assistant Examiner*—Enam Ahmed
(74) *Attorney, Agent, or Firm*—Oblon, Spivak, McClelland, Maier & Neustadt, P.C.

(57) ABSTRACT

Cyclic-redundancy-check (CRC) processing is executed on data blocks each having a predetermined data amount, thereby calculating respective CRC values for the data blocks. Furthermore, CRC processing is executed on the respective CRC values a number of times determined according to random numbers that are generated sequentially, thereby generating sig values to be attached respectively to next data blocks.

10 Claims, 6 Drawing Sheets

FIG. 4

| 1ST ROW | UNUSED | D (1) | CRC (1) |
|---|---|---|---|
| 2ND ROW | sig (1) | D (2) | CRC (2) |
| 3RD ROW | sig (2) | D (3) | CRC (3) |
| ⋮ | ⋮ | ⋮ | ⋮ |
| (n-1)-TH ROW | sig (n−2) | D (n−1) | CRC (n−1) |
| n-TH ROW | sig (n−1) | D (n) | CRC (n) |
| (n+1)-TH ROW | sig (n) | | |

DATA PROCESSING METHOD AND DATA CHECKING METHOD

BACKGROUND OF THE INVENTION

1. Field of the Invention

The present invention relates to a data processing method that is used when transmitting or recording data, and to a data checking method for checking data processed by the data processing method.

2. Description of the Related Art

Recently, data processing apparatuses that are capable of various data processing such as transmission, recording, or playback of data have been developed.

In relation to such data processing apparatuses, techniques that enhance data security have been proposed, for example, for transmitting or storing important data.

For example, Japanese Unexamined Patent Application Publication No. 09-009242 discloses techniques for enhancing security of specific information by applying a plurality of measures for preventing tampering.

According to the data processing apparatuses described above, the risk of data being tampered by a malicious third party, for example, during transmission or storage of the data, has existed. Therefore, demand for a method of readily checking the validity of data transmitted or stored has existed.

SUMMARY OF THE INVENTION

The present invention has been made in view of the situation described above. The present invention, in one aspect thereof, provides a data processing method at least including the steps of calculating a cyclic-redundancy-check (CRC) value by executing CRC processing on a data block having a predetermined data amount; and executing CRC processing a number of times on the CRC value to generate a check value that is to be attached to a next data block.

According to the data processing method, CRC processing is executed on a data block having the predetermined data amount to calculate a CRC value, and CRC processing is executed on the CRC value a number of times determined, for example, according to random numbers that are generated sequentially, thereby generating and attaching a check value to a next data block. Accordingly, even if data is tempered with by a third party, the tampering of the data can be detected using check values attached to the data.

The present invention, in another aspect thereof, provides a data checking method for checking data in which each data block, having a predetermined data amount, has a CRC value and a check value attached thereto, wherein data is checked by comparing a value calculated by executing CRC processing a number of times on a CRC value attached to a data block with a check value attached to a next data block.

According to the data checking method, for example, when data is read, a value obtained by executing CRC processing on a CRC value attached to a data block, a number of times determined, for example, according to random numbers that are generated sequentially, is compared with a check value attached to a next data block. Accordingly, it is possible to determine whether the data has been tampered with or otherwise altered.

As described above, according to the data processing method of the present invention, CRC processing is executed on a data block having a predetermined data amount to calculate a CRC value, and CRC processing is executed on the CRC value a number of times determined, for example, according to random numbers that are generated sequentially, thereby generating a check value to be attached to a next data block. Accordingly, even if data is corrupted or tampered with by a malicious third party while the data is transmitted or stored, it is possible to readily detect the change, so that it is possible to readily check the validity of the data.

Furthermore, according to the data checking method of the present invention, for example, when data is read, a value obtained by executing CRC processing on a CRC value attached to a data block, a number of times determined, for example, according to random numbers that are generated sequentially, is compared with a check value attached to a next data block. Accordingly, it is possible to check whether the data has been corrupted or tampered with by a malicious third party while the data is transmitted or stored.

BRIEF DESCRIPTION OF THE DRAWINGS

FIG. 4 is a diagram schematically showing a data structure of a memory;

DESCRIPTION OF THE PREFERRED EMBODIMENTS

Now, preferred embodiments of the present invention will be described.

Figure 1:
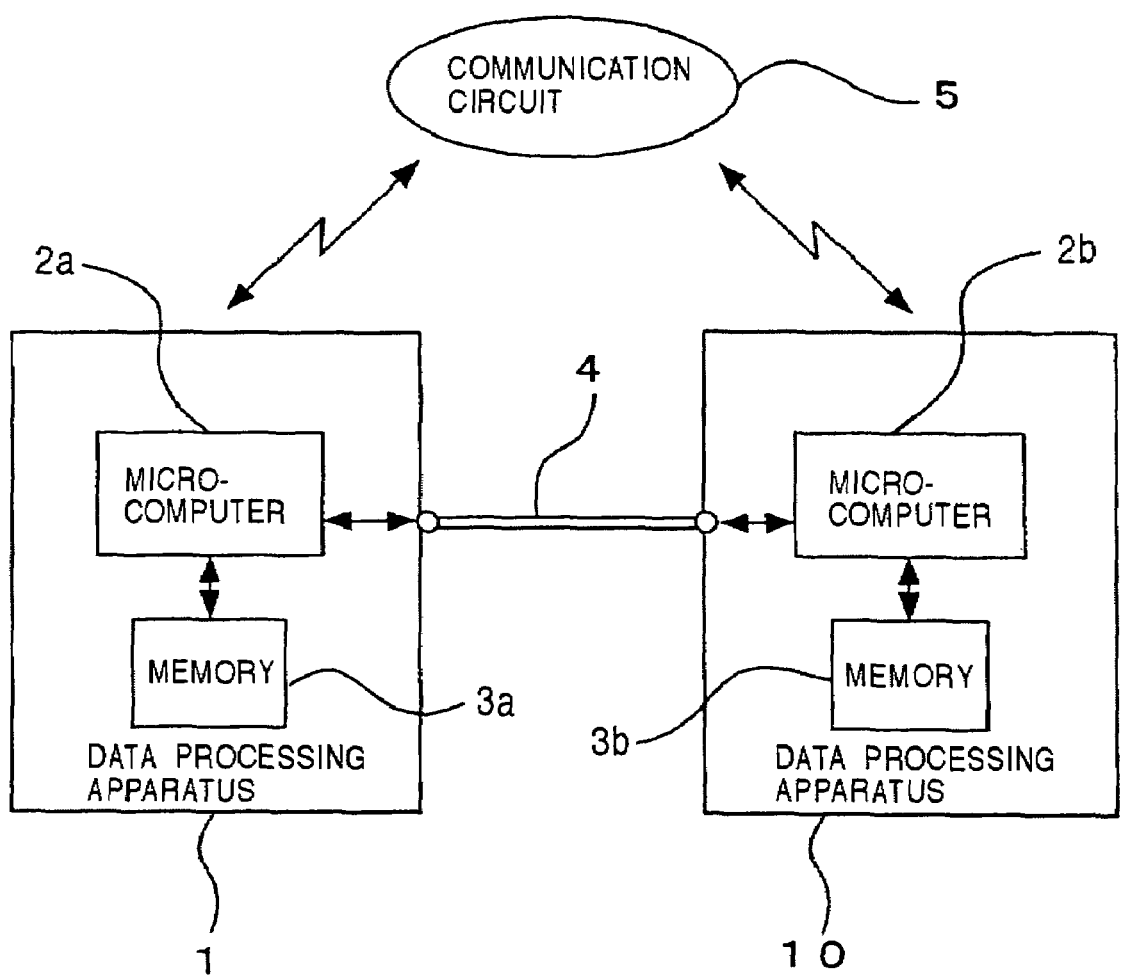
FIG. 1 is a diagram showing the configuration of a data processing apparatus according to an embodiment of the present invention.

FIG. 1 is a diagram showing the configuration of a data processing apparatus for implementing a data processing method and a data checking method according to an embodiment of the present invention.

A data processing apparatus 1 shown in FIG. 1 is included, for example, in electronic equipment that is capable of transmitting, recording, or playing back data.

The data processing apparatus 1 at least includes a microcomputer 2a and a memory 3a. The microcomputer 2a includes a central processing unit (CPU) or the like, and it is capable of writing various data to the memory 3a and reading data from the memory 3a.

Furthermore, the data processing apparatus 1, when connected via a cable 4 with a data processing apparatus 10 having equivalent functions as the data processing apparatus 1, is allowed to exchange data with the data processing apparatus 10.

Furthermore, the data processing apparatuses 1 can be connected with the data processing apparatus 10 via a communication circuit 5. The communication circuit 5 may be a public network or a private line that is wired or wireless, and various types of communication circuits, for example, the Internet, a satellite communication network, or an optical fiber network, may be used.

In the data processing apparatus 1, when various data is transmitted or recorded, error checking code is attached to the data to be transmitted or recorded. Thus, even when an error occurs in the data in the course of transmission, recording, or playback, original data can be estimated using the error checking code. For this purpose, the microcomputer 2a includes an error detecting circuit based on cyclic redundancy check (CRC), which is well known as a functional block for adding error checking code to data that is to be transmitted or recorded.

In CRC, for example, when data is transmitted or recorded, calculation is performed on the data according to a predetermined generator polynomial, and a result of the calculation, e.g., a two-byte CRC code (hereinafter referred to as a CRC value), is attached to the data before transmission or recording. Accordingly, an error that occurs during transmission or recording can be detected.

Various generator polynomials used for CRC have been proposed. For example, the generator polynomial ($X^{16}+X^{12}+X^5+1$) recommended by CRC-CCITT (Consulting Committee of International Telegraph and Telephone) is well known. Since a CRC-based error detecting circuit can be implemented by a relatively simple circuit, it can be readily implemented in the CPU of the microcomputer 2a.

Figure 2:
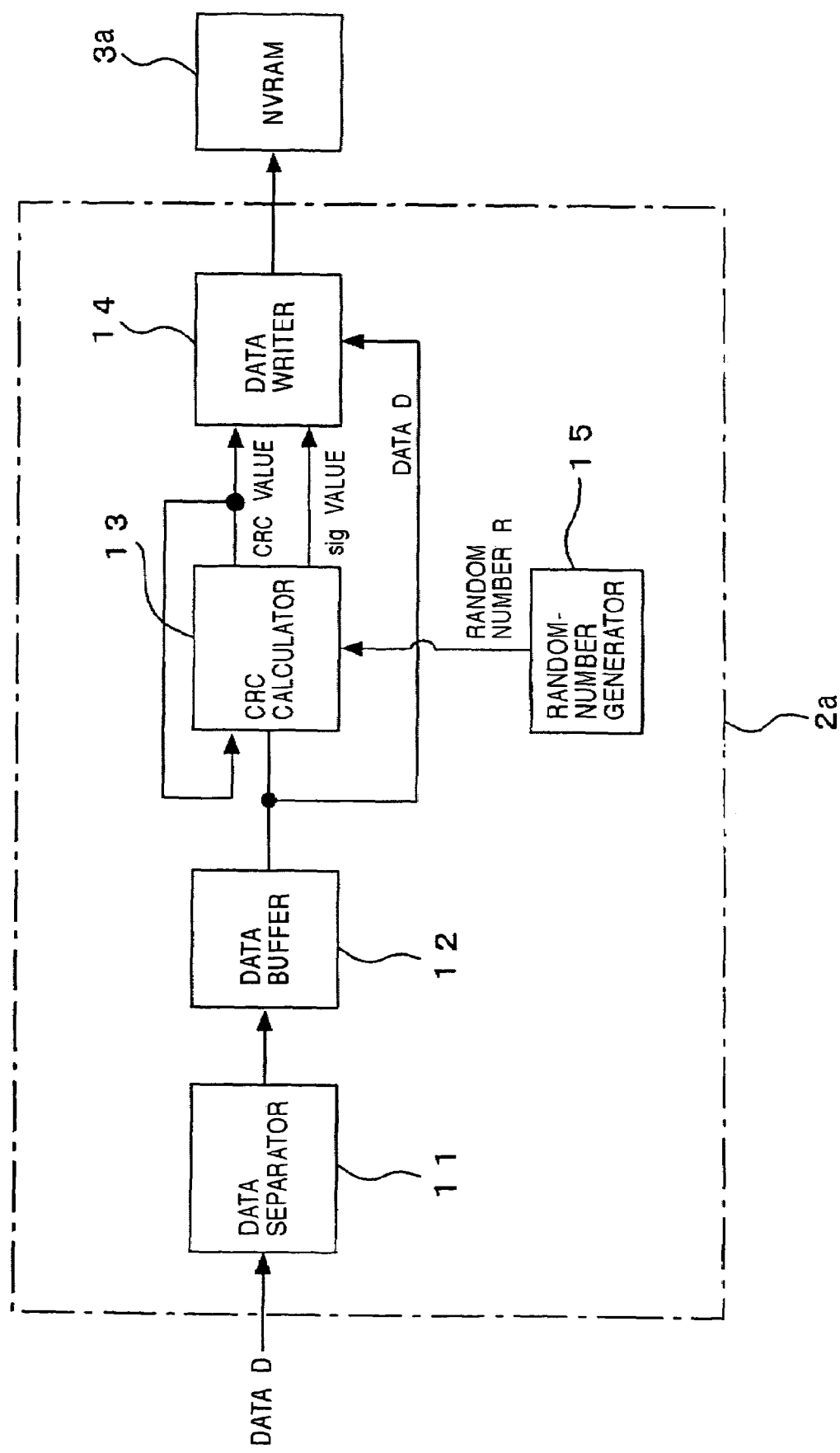
FIG. 2 is a diagram showing the configuration of a CRC functional block provided in a microcomputer.

FIG. 2 is a diagram showing the configuration of a CRC block included in the microcomputer 2a of the data processing apparatus 1.

Referring to FIG. 2, a data separator 11 separates actual data that is input to the microcomputer 2a into data segments each composed of a predetermined number of bytes, and sequentially outputs the data segments to a data buffer 12.

The data buffer 12 temporarily holds the data segments D input from the data separator 11, and outputs the data segments D to a CRC calculator 13 on a byte-by-byte basis.

The CRC calculator 13 is implemented using, for example, a shift register. When one-byte data is input, the CRC calculator 13 generates, for example, a two-byte CRC value from the one-byte data according to the generator polynomial. It is to be understood that the generator polynomial used in the CRC calculator 13 is not limited to the generator polynomial described earlier.

In order to allow the CRC calculator 13 to generate a CRC value for a data segment D composed of the predetermined number of bytes, the data segment is continuously input from the data buffer 12 on a byte-by-byte basis until all the data segment D composed of the predetermined number of bytes is input, and then a CRC value for the data segment D is generated.

In this embodiment, the CRC value for the data segment D composed of the predetermined number of bytes, generated by the CRC calculator 13, is fed back to the CRC calculator 13, and CRC calculation is further performed on the CRC value a number of times according to a random number R fed from a random-number generator 15, thereby generating a check value (hereinafter referred to as a "sig value") composed of a predetermined number of bytes. The method of calculating a sig value in the CRC calculator 13 will be described later.

A data writer 14 writes the data segment D transferred from the data buffer 12, and a CRC value and a sig value generated by the CRC calculator 13, to the memory 3a at specific timing.

The random-number generator 15 has a predefined random-number table, formula, or the like. The random-number generator 15 applies seed data that serves as a seed of random numbers to the random-number table or formula, and thereby generates random numbers R(1), R(2), ... R(n) sequentially.

In this case, the random numbers R(1), R(2), ... R(n) vary each time sig values sig(1), sig(2), ... sig(n) are generated.

The random-number generator 15 always generates the same pattern of random numbers R(1), R(2), ... R(n) as long as the seed data is the same.

The random-number table, formula, seed data, or the like, used in the random-number generator 15, may be stored in advance in the microcomputer 2a, or obtained via the cable 4 or the communication circuit 5.

It is to be noted that when data is exchanged between the data processing apparatuses 1 and 10, the random-number table, formula, seed data, or the like, used in the random-number generator 15 of the data processing apparatus 1 and its counterpart in the data processing apparatus 10, must be common so that the data processing apparatuses 1 and 10 will generate the same pattern of random numbers R(1), R(2), ... R(n).

As described above, in the data processing apparatus 1 according to this embodiment, actual data that is input is separated by the data separator 11 into data segments D(1), D(2), ... D(n) each composed of a predetermined number of bytes, the data segments D(1), D(2), ... D(n) are sequentially input to the CRC calculator 13, and respective CRC values CRC(1), CRC(2), ... CRC(n) for the data segments D(1), D(2), ... D(n) are generated.

Then, from the CRC values CRC(1), CRC(2), ... CRC(n) generated by the CRC calculator 13, sig values sig(1), sig(2), ... sig(n) for checking the CRC values CRC(1), CRC(2), ... CRC(n) are generated.

When input data is written to the memory 3a, the sig values sig(1), sig(2), ... sig(n) are written to the memory 3a together with the data segments D(1), D(2), ... D(n) and the CRC values CRC(1), CRC(2), ... CRC(n).

Now, a method of calculating check values in the CRC calculator 13 will be described with reference to FIG. 3.

Figure 3:
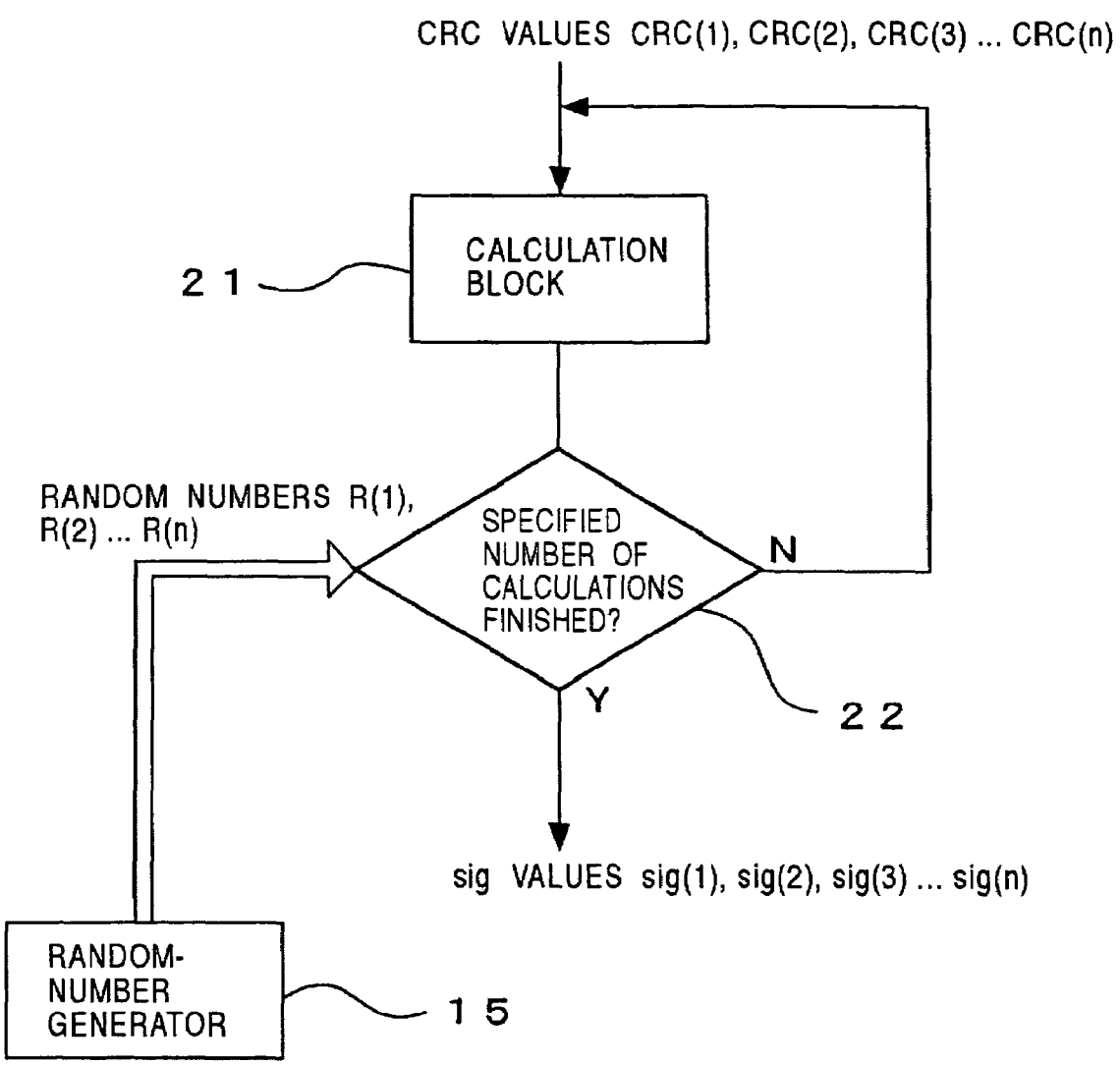
FIG. 3 is diagram for explaining a method of calculating a check value.

FIG. 3 is diagram showing the configuration of blocks for generating check values from CRC values in the CRC calculator 13 shown in FIG. 2.

Referring to FIG. 3, a calculation block 21 is a block for performing CRC calculation on one byte of input data. In this embodiment, on the CRC values CRC(1), CRC(2), ... CRC(n) for the data segments D(1), D(2), ... D(n), generated in the calculation block 21, CRC processing is executed a number of times determined according to the random numbers R(1), R(2), ... R(n) from the random-number generator 15, respectively, thereby generating check values (sig values) sig(1), sig(2), ... sig(n).

For example, when the sig value sig(1) for the CRC value CRC(1) is calculated in the calculation block 21, the CRC value CRC(1) output from the calculation block 21 is input to a determining block 22.

The determining block 22 determines whether the calculation block 21 has performed CRC calculation a number of times determined according to the random number R(1) on the CRC value CRC(1) input from the calculation block 21.

If the determination turns out negative, that is, when it is determined that CRC calculation has not been performed a number of times determined according to the random number R(1), the value input from the calculation block 21 is fed back to the calculation block 21.

If the determination in the determining block 22 turns out positive, that is, when it is determined that the calculation block 21 has performed CRC calculation on the CRC value CRC(1) a number of times determined according to the random number R(1), the value input from the calculation block 21 is output as the sig value sig(1).

Then, similar processing is executed on the CRC values CRC(2) to CRC(n) sequentially input from the calculation block 21, thereby obtaining sig values sig(2) to sig(n).

FIG. 4 is a diagram schematically showing an example data structure that is used when data is stored in the memory 3a of the data processing apparatus 1 according to this embodiment.

In the data processing apparatus 1 according to this embodiment, when data that is actually input is written to the memory 3a, data segments D(1), D(2), ... D(n), respective CRC values CRC(1), CRC(2), ... CRC(n) for the data segments D(1), D(2), ... D(n), and sig values sig(1), sig(2), ... sig(n) obtained from the CRC values CRC(1), CRC(2), ... CRC(n), are written to the memory 3a.

In that case, first, on the first line of the memory 3a, the data segment D(1) and the CRC value CRC(1) associated therewith are written.

At this time, a data area for writing a sig value at the beginning of the first line of the memory 3a is not used, and the data segment D(1) and the CRC value CRC(1) are written in that order from a data area for writing a data segment. The sig value sig(1) is written to a data area for writing a sig value on the second line when the next data segment D(2) and the CRC value CRC(2) associated therewith are written. Thus, on the second line of the memory 3a, the sig value sig(1), the data segment D(2), and the CRC value CRC(2) are written in that order from the beginning of the line.

In data areas on the third line, the sig value sig(2), the data segment D(3), and the CRC value CRC(3) are written in that order from the beginning of the line. Subsequent sig values, data segments, and CRC values are written in a similar manner. Finally, the last sig value sig(n) is written at the beginning of a data area on the (n+1)-th line, as shown in FIG. 4.

As described above, when the sig values sig(1), sig(2), ... sig(n) are written to the memory 3a, the sig values sig(1), sig(2), ... sig(n) are written with the next data segments D(2), D(3), ... attached at the beginning so that CRC processing and data writing to the memory 3a can be executed concurrently and efficiently, allowing high-speed data processing.

In this embodiment, when the sig values sig(1), sig(2), ... sig(n) are written to the memory 3a, the sig value sig(1) is attached to the beginning of the data segment D(2) and the sig value sig(2) is attached to the beginning of the data segment D(3). However, this is only an example, and the sig values sig(1), sig(2), ... sig(n−1) need not necessarily be attached at the beginning of the data segments D(2), D(3), ... D(n) and may be attached in other data areas of the data segments D(2), D(3), ... D(n).

Furthermore, in the data processing apparatus 1 according to this embodiment, when the data written to the memory 3a in the manner described above is read, the data segments D(1), D(2), ... D(n) stored in the memory 3a are checked using the CRC values CRC(1), CRC(2), ... CRC(n) and the sig values sig(1), sig(2), ... sig(n) stored in the memory 3a. That is, it is checked whether the data segments D(1), D(2), ... D(n) stored in the memory 3a are valid data that has not been corrupted or tampered with by a malicious third party.

For this purpose, the data processing apparatus 1 again executes CRC processing on the CRC values CRC(1), CRC(2), ... CRC(n) read from the memory 3a, a number of times determined according to the random numbers R(1), R(2), ... R(n) generated by the random-number generator 15, respectively. Then, the data processing apparatus 1 compares the calculation results X(1), X(2), ... X(n) with the sig values sig(1), sig(2), sig(n) read from the memory 3a to check the data.

The sig values sig(1), sig(2), ... sig(n) for checking validity, stored in the memory 3a, are respectively generated from the CRC values CRC(1), CRC(2), ... CRC(n) obtained when the data segments D(1), D(2), ... D(n) are written to the memory 3a and from the random numbers R(1), R(2), ... R(n) generated by the random-number generator 15. Thus, it is almost impossible for a third party who does not know the calculation method described above and the random numbers R(1), R(2), ... R(n) to calculate the sig values sig(1), sig(2), ... sig(n).

Therefore, even if data in the memory 3a is read by a malicious third party and the data and CRC values are tampered with by the third party, it is not possible to tamper with the sig values sig(1), sig(2), ... sig(n) in accordance with the altered data and CRC values. Thus, by performing the data checking described above, it is possible to check whether the data in the memory 3a is valid.

Furthermore, for example, even when the data stored in the memory 3a is corrupted by some reason, it is possible to check by the data checking described above whether the data is corrupted.

Furthermore, for example, when some trouble occurs while overwriting data stored in the memory 3a with new data to update the previous data, causing the data update of the memory 3a to be aborted in the middle, it is possible to find by the data checking described above which line of the memory 3a includes incorrect data, so that it is possible to readily determine up to which line the updating of data has finished.

Therefore, when data is updated again, it suffices to overwrite only data that has not been updated.

Figure 5:
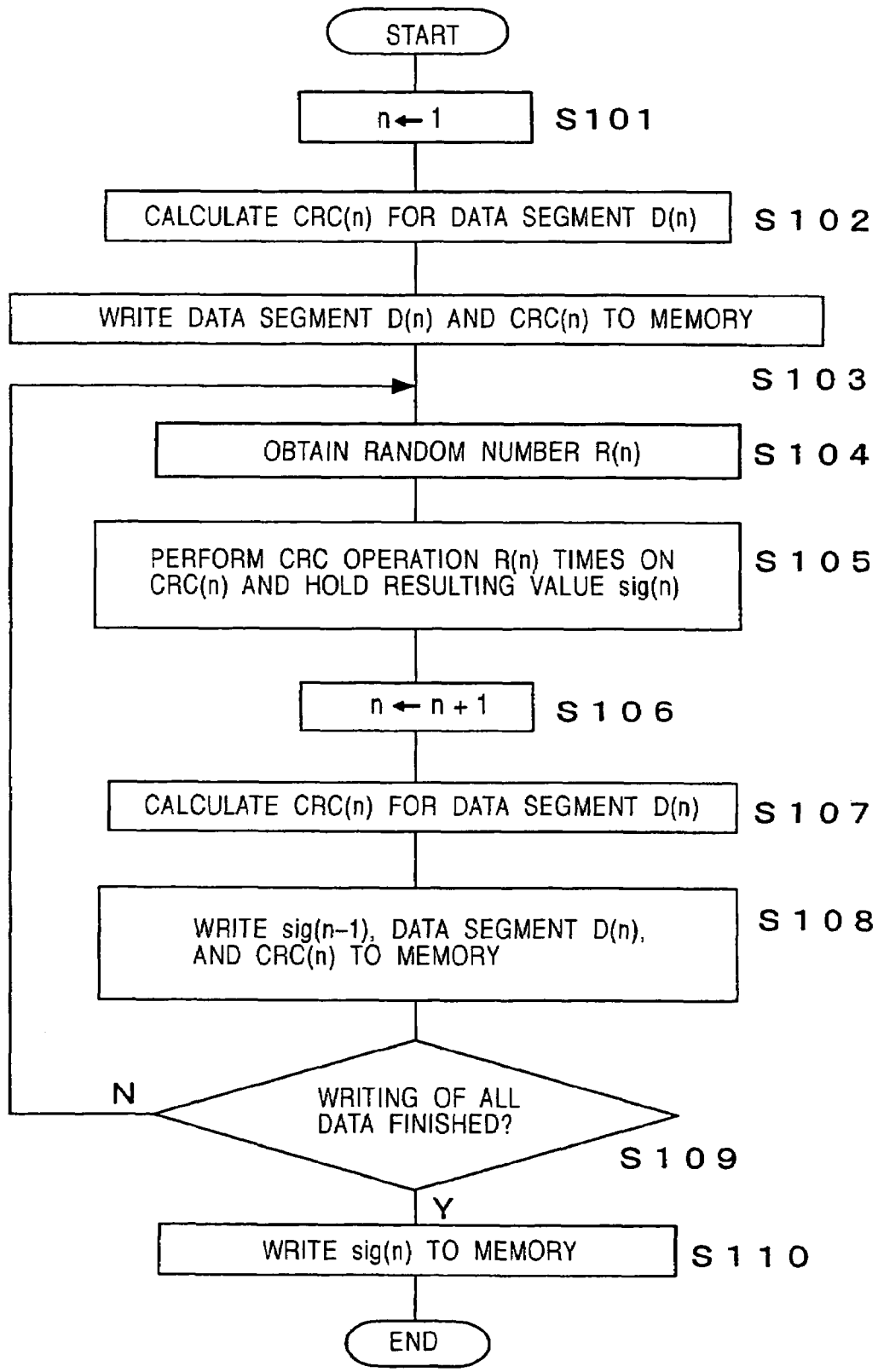
FIG. 5 is a flowchart of data processing for writing data to the memory.

Now, an example of processing for writing data to the memory 3a will be described more specifically with reference to a flowchart shown in FIG. 5.

First, in step S101, the microcomputer 2a assigns "1" to a variable n. Then, in step S102, the microcomputer 2a inputs a data segment D(1) that is input via a data buffer 12 to the CRC calculator 13 on a byte-by-byte basis, and performs CRC calculation to obtain a CRC value CRC(1) for the data segment D(1).

Then, in step S103, the microcomputer 2a exercises control so that the data segment D(1) and the two-byte CRC value CRC(1) will be written to the data area on the first line of the memory 3a.

At this time, the microcomputer 2a exercises control so that the first two bytes of the data area on the first line of the memory 3a will not be used and so that data will be written from the third byte of the data area, as shown in FIG. 4.

Then, in step S104, the microcomputer 2a obtains a random number R(1) from the random-number generator 15 in the microcomputer 2a. Then, in step S105, the microcomputer 2a performs CRC calculation a number of times determined according to the random number R(1) on the CRC value CRC(1) calculated in step S102. The microcomputer 2a holds the calculation result as a sig value sig(1).

Then, in step S106, the microcomputer 2a increments the value of the variable n by 1. Then, in step S107, the microcomputer 2a performs CRC calculation on the next data segment D(2) to obtain a CRC value CRC(2).

Then, in step S108, the microcomputer 2a exercises control so that the sig value (1) held in step S105, the data segment D(2), and the CRC value CRC(2) will be written from the beginning of the data area on the second line of the memory 3a.

Then, in step S109, it is determined whether writing of all the data has been finished. If writing of all the data has not been finished, the procedure returns to step S104, and processing from step S104 is executed.

The processing from step S104 is executed until it is determined in step S109 that writing of all the data has been finished.

If it is determined in step S109 that writing of all the data has been finished, the procedure proceeds to step S110. In step S110, the value of a sig value sig(n) that is obtained last is written from the beginning of the (n+1)-th line of the memory 3a. The procedure is then exited. Thus, data is written in the data structure shown in FIG. 4.

Figure 6:
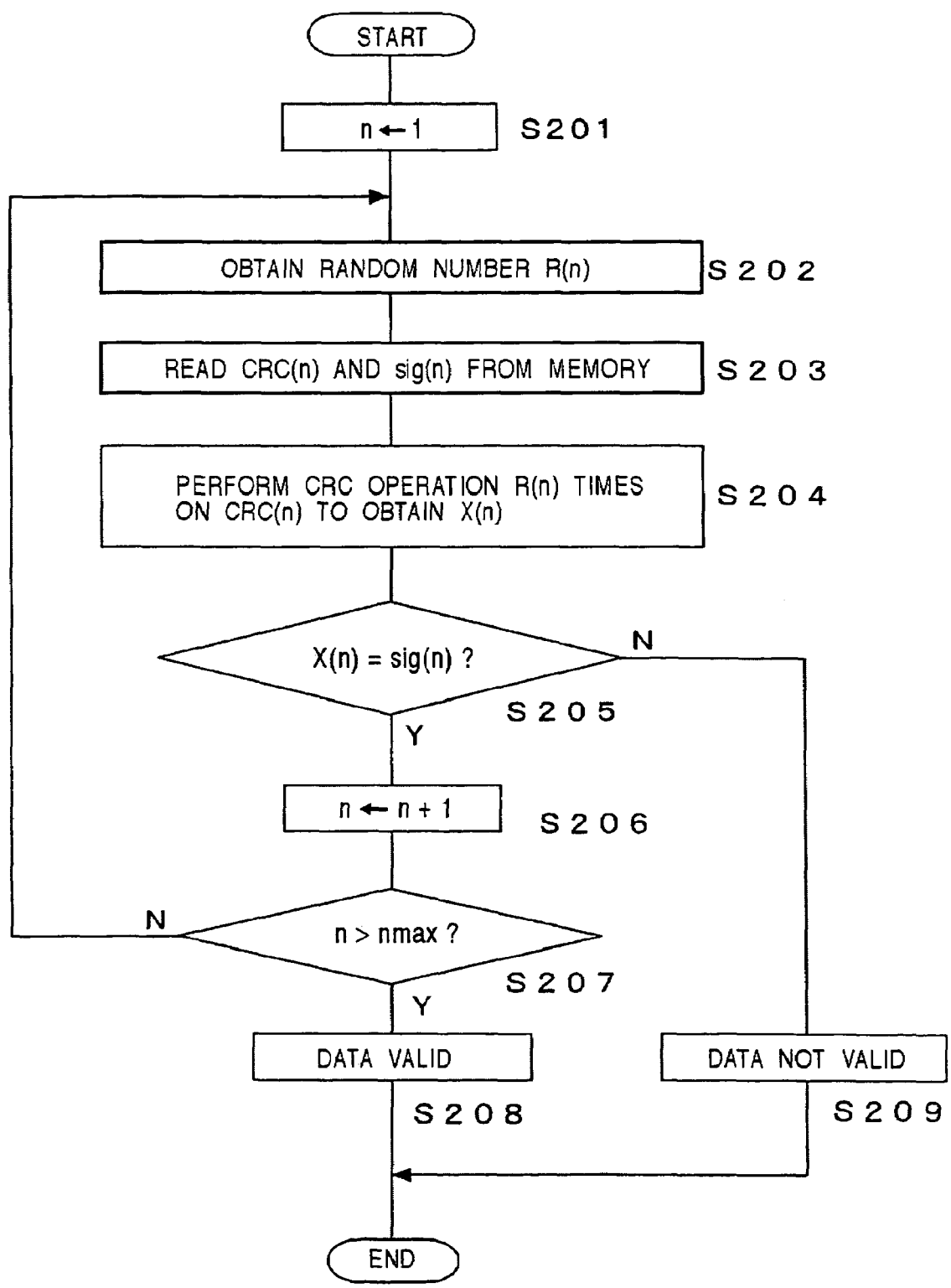
FIG. 6 is a flowchart of processing for checking data stored in the memory.

Next, an example of processing for checking data written to the memory 3a in the manner described above will be described with reference to a flowchart shown in FIG. 6.

In step S201, the microcomputer 2a assigns "1" to a variable n. Then, in step S202, the microcomputer 2a obtains a random number R(1) from the random-number generator 15.

Then, in step S203, the CRC value CRC(1) and the sig value sig(1) of data to be read is read from the memory 3a. In step S204, CRC calculation is performed on the CRC value CRC(1) a number of times determined according to the random number R(1), obtaining a calculation result X(1).

Then, in step S205, it is determined whether the calculation result X(1) coincides with the sig value sig(1) read from the memory 3a. If the calculation result X(1) coincides with the sig value sig(1), it is determined that the data segment D(1) stored in the memory 3a is valid. Then, the procedure proceeds to step S206.

Then, in step S206, the value of the variable n is incremented by 1. Then, in step S207, it is determined whether the variable n has reached a maximum value nmax. That is, in this case, it is determined whether calculation results X(n) calculated from all the CRC values CRC(n) of data to be read from the memory 3a have been compared with the sig values sig(n) read from the memory 3a. If the comparison has all been finished, the procedure proceeds to step S208. In this case, the data to be read is valid data. That is, the data checking ends with a result that the data to be read is has not been tampered with or corrupted.

On the other hand, if it is determined in step S205 that the calculation result X(n) calculated from the CRC value CRC(n) does not coincide with the sig value sig(n) read from the memory 3a, the procedure proceeds to step S209. In this case, the data to be read is not valid data. That is, the data checking ends with a result that the data to be read is has been tampered with or corrupted.

Furthermore, in this case, the determination in step S205 allows recognition in step S209 as to which line of the memory 3a includes data D(n) that is not valid. Thus, by returning to step S206 after the processing in step S209 and continuing checking for all the data to be read, it is possible to determine which lines of the memory 3a include incorrect data on a row-by-row basis.

In this embodiment, for example, when data is transmitted to the data processing apparatus 10 via the cable 4 or the communication circuit 5, the data processing described above is executed in the data processing apparatus 1 on the transmitting side, and the data checking described above is executed in the data processing apparatus 10 on the receiving side, so that tampering of data during transmission can be detected.

Furthermore, although a CRC value is obtained from a data segment formed by the data separator 11 in this embodiment, a CRC value may be obtained from a sig value of a previous CRC value and a data segment D. For example, a CRC value CRC(2) may be obtained from a sig value sig(1) and a data segment D(2). In that case, it becomes more difficult for a malicious third party to calculate the CRC value, so that tampering of data by a third party can be detected more reliably.

What is claimed is:

1. A computer-implemented data processing method for processing a plurality of data blocks, the method, comprising:
    calculating a cyclic-redundancy-check value by executing cyclic-redundancy-check processing on a data block of the plurality of data blocks having a predetermined data size;
    executing cyclic-redundancy-check processing a random number of times on the cyclic-redundancy-check value to generate a check value that is to be attached to a next data block of the plurality of data blocks; and
    storing said check value and said cyclic-redundancy check value in a memory.

2. The data processing method according to claim 1, wherein the random number of times is changed each time a check value is generated in the calculating step.

3. The data processing method according to claim 1, wherein, in a data area for storing a data block having the predetermined data size, the data block, a cyclic-redundancy-check value for the data block, and a check value generated from a cyclic-redundancy-check value of a data block that is stored in an immediately preceding data area are stored.

4. A computer-implemented data checking method for checking data in which each data block of a plurality of data blocks, having a predetermined data size, has a cyclic-redundancy-check value and a check value attached thereto, comprising:
    comparing a value calculated by executing cyclic-redundancy-check processing a number of times on the cyclic-redundancy-check value attached to the data block with a check value attached to a next data block of the plurality of data blocks; and
    determining whether the data block is valid based on a result of the comparing step.

5. The data checking method according to claim 4, wherein the number of times is determined according to random numbers that are generated sequentially, and is changed each time a check value is generated.

6. A data processing device for processing a plurality of data blocks, comprising:
    means for calculating a cyclic-redundancy-check value by executing cyclic-redundancy-check processing on a data block of the plurality of data blocks having a predetermined data size;
    means for executing cyclic-redundancy-check processing a random number of times on the cyclic-redundancy-check value to generate a check value that is to be attached to a next data block of the plurality of data blocks; and
    means for storing said check value and said cyclic-redundancy check value in a memory.

7. The data processing device according to claim 6, further comprising means for changing the random number of times each time a check value is generated by the means for calculating.

8. The data processing device according to claim 6, further comprising means for storing, the data block, a cyclic-redundancy-check value for the data block, and a check value generated from a cyclic-redundancy-check value of a data block that is stored in an immediately preceding data area.

9. A data checking device for checking data in which each data block of a plurality of data blocks, having a predetermined data size, has a cyclic-redundancy-check value and a check value attached thereto, comprising:

a processor configured to compare a value calculated by executing cyclic-redundancy-check processing a number of times on the cyclic-redundancy-check value attached to a data block with a check value attached to a next data block of the plurality of data blocks, and to determine whether the data block is valid based on a result of the comparison.

10. The data checking devise according to claim 9, further comprising means for determining the number of times according to random numbers that are generated sequentially, and changing the number of time each time a check value is generated.

* * * * *